Patented Nov. 18, 1952

2,618,561

UNITED STATES PATENT OFFICE 2,618,561

PROCESS OF PRODUCING STABLE GARLIC PREPARATIONS

Josef Špinka and Julius Stampfer, Prague, Czechoslovakia

No Drawing. Application November 20, 1948, Serial No. 61,304. In Czechoslovakia January 10, 1948

5 Claims. (Cl. 99—140)

Garlic was considered as early as in ancient times as a curative medium and is recorded in the medical annals at the time when the Egyptian pyramids were built. In recent times garlic not only has lost nothing of its reputation in curative treatments but rather, has gained, since after the discovery of modern antibiotic agents, such as penicillin and other preparations of this kind, the antibiotic properties of the garlic as a means against the growth of many microorganisms has been confirmed.

Hitherto, garlic preparations have been obtained from the drug in various ways, more particularly by extracting the garlic bulbs, for example by means of alcohol or hot water or by pressing therefrom the garlic juice in a mechanical way and mixing the same with active coal or other substances. Also, garlic preparations have been obtained by drying out the drug after a convenient mechanical treatment, eventually in a vacuum at an adequately high temperature. All these hitherto familiar methods no longer correspond to present knowledge in the field of antibiotic substances, but are also highly uneconomical in view of the unsatisfactory yield and the lack of stableness of the efficient matter. By systematic tests and research work it has now been found according to the present invention that organic sulphides are contained in the garlic bulb, and as a matter of fact, under the form of glycosides wherefrom only by the enzymatic action, either on the part of the enzyme present in the garlic bulbs or through the action of certain microorganisms vegetating on the garlic bulbs, the splitting off is brought about in optimum surroundings of organic compounds, in the form of alkyl sulphides. It is obvious that the dietetic, more particularly antibiotic and, generically speaking, the curative effect of garlic preparations depends upon the very content of alkyl sulphides therein and therefore the hitherto known garlic preparations have a variable efficiency according to whether by hazard during the treatment or storage, a natural fermentation had taken place and if an adequate separation of the garlic glycosides was brought about.

It is generally known that intact garlic bulbs have only a feeble smell, which smell, however, is intensified immediately upon their being cut up or crushed. It has been supposed that the volatile smelling substances consisting substantially of allylsulphides have their origin in higher molecular genuine substances which have only a feeble smell or no smell at all; and that these volatile substances are produced by enzymatic fermentation.

The present invention relates only to the process for the production of stable garlic preparations without the usual extraction, by preparing suitable suroundings for enzymatic fermentation and by stabilizing the resulting product with a colloidal silicic acid in a nascent state.

On studying this enzymatic splitting, the optimum conditions of the splitting process have been researched most thoroughly in all particulars and it was found that under certain conditions the glycosides contained in the garlic may be entirely split off so that the preparations resulting therefrom present an extremely efficient mixture of alkyl sulphides, propyl sulphides, diallyl tetrasulphides and diallyl sulphides. After the determination of the optimum conditions of the splitting process, the hitherto known and familiar producion methods have been studied from this standpoint and it was found that for example any addition of alcohol interferes with the enzymatic splitting process and that it is indispensable to maintain a relatively high acidity during the splitting process, but by no means with the use of mineral acids, and on the contrary, exclusively with simple aliphatic acids. The best results have been found with the use of acetic or citric acids. Further tests have shown that for attaining a convenient fermentation effect it is necessary, in addition to the maintenance of acidity, to increase in the medium, the content of a simple sugar such as glucose and of inorganic nitrogen and phosphorus, ammonium phosphate having proved to be the most efficient compound in this latter respect. During the research tests it has also been found to be necessary to prevent losses in alkyl sulphides and it has been proved that such losses can be precluded merely by means of a colloidal system, silicic acid in the nascent state having proved to be the best means in this respect. The final reaction product thus obtained according to the invention enables the highest effect of the eucolloidity of the alkyl sulphides to be attained together with their simultaneous stabilization.

In carrying the process into effect, the temperature range plays an important part within which the most thorough and reliable splitting of the garlic glycosides takes place. It was found that this limit is between 25 and 35 degrees centigrade. The more the temperature approaches 30 degrees centigrade, the quicker and more perfect is the fermentation process. The principle of the process according to the present invention will hereinafter be explained with reference to two examples:

I. Garlic blubs, after having been crushed, for example in a meat mincing machine, are introduced into a suitable vessel whereupon a mixture of 3 to 8 per cent acetic acid is poured wherein previously .5 per cent glucose and .08 per cent ammonium phosphate have been dissolved. Thereupon the temperature is increased while repeatedly stirring the solution to 25 to 30 degrees centigrade and at this steady temperature the fermentation takes place, which fermentation continues from 5 to a maximum of 8 days. After the fermentation having been completed, the mass is filtered whereupon the system of alkyl sulphides are immediately stabilized with the use of colloidal silicic acid in a nascent state, for example by dripping into the liquid under repeated stirring a small amount of a concentrated solution of sodium silicate until a more or less thick consistent syrup or a solid jelly is obtained.

II. Garlic bulbs, after having been crushed for example in a meat mincing machine, are treated with a 1 to 5 per cent aqueous solution of citric acid, wherein previously .5 per cent glucose and .08 per cent ammonium phosphate have been dissolved. Thereupon the same process is repeated as described with reference to Example I above.

The process in accordance with the present invention offers the advantage of producing a maximum yield of alkyl sulphides to be attained respectively to produce in this way garlic preparations having a maximum efficiency and being perfectly stable, the protective colloid, vis. silicic acid used for stabilizing having also a therapeutic effect and building thus no ballast. Finally, the process according to this invention presents the feature of enabling the final preparations to be produced in a solid state, as by drying in a vacuum, as the colloidal type of silicic acid prevents any losses with relation to the activity and to the content of efficient alkyl sulphides.

We claim:

1. The process for the production of stable garlic preparations having a high content of alkyl sulphides from fresh garlic bulbs, which comprises the steps of: crushing the fresh garlic bulbs, subjecting the crushed garlic to an enzymatic fermentation induced by the enzyme present in the garlic bulbs in the presence of an organic acid of the class consisting of acetic and citric acids and in the presence of glucose and ammonium phosphate, and stabilizing the resulting mixture of alkyl sulphides after fermentation with a colloidal silicic acid in a nascent state.

2. The process for the production of stable garlic preparations having a high content of organic sulphides, from fresh garlic bulbs, which comprises the following steps: crushing the fresh garlic bulbs, subjecting the crushed garlic to an enzymatic fermentation induced by the enzyme present in the garlic bulbs in the presence of organic acids of the class consisting of acetic and citric acids and in the presence of glucose and ammonium phosphate, filtering the mass after fermentation has been completed, and stabilizing the resulting mixture of alkyl sulphides with a collodial silicic acid in a nascent state.

3. The process for the production of stable garlic preparations having a high content of alkyl sulphides, from fresh garlic bulbs, which comprises the following steps: crushing the fresh garlic bulbs, subjecting the crushed garlic to an enzymatic fermentation induced by the enzyme present in the garlic bulbs in the presence of a mixture of 3–8% acetic acid in which 0.5% glucose and 0.08% ammonium phosphate have been dissolved, subjecting the aforesaid mixture of garlic and acetic acid to repeated stirring within the temperature range of from substantially 25° C. to 35° C. causing said fermentation to take place within the period of from substantially 5–8 days, filtering the mass after fermentation has been completed, and stabilizing the resulting mixture of alkyl sulphides by dripping into the liquid under repeated stirring a small amount of a concentrated solution of sodium silicate whereby the resultant reaction product, varying from substantially a thick consistent syrup to a solid jelly, is obtained.

4. The process for the production of stable garlic preparations having a high content of alkyl sulphides, from fresh garlic bulbs, which comprises the following steps: crushing the fresh garlic bulbs, subjecting the crushed garlic to an enzymatic fermentation induced by the enzyme present in the garlic bulbs in the presence of a mixture of 1–5% aqueous solution of citric acid, in which 0.5% glucose and 0.08% ammonium phosphate have been dissolved, subjecting the aforesaid mixture of garlic and citric acid to repeated stirring within the temperature range of from substantially 25° C. to 35° C. causing fermentation to take place within the period of from substantially 5–8 days, filtering the mass after fermentation has been completed, and stabilizing the resulting mixture of alkyl sulphides by dripping into the liquid under repeated stirring a small amount of a concentrated solution of sodium silicate whereby the resultant reaction product, varying from substantially a thick consistent syrup to a solid jelley, is obtained.

5. As an article of manufacture, a stable garlic preparation having a high content of alkyl sulphides of substantially fresh garlic bulbs, formed by the process of crushing the garlic bulbs, subjecting the crushed garlic to an enzymatic fermentation induced by the enzyme present in the garlic bulbs in the presence of organic acids of the class consisting of acetic and citric acids and in the presence of glucose and ammonium phosphate, filtering the mass after fermentation has been complete, and stabilizing the resulting mixture of alkyl sulphides with a colloidal silicic acid in a nascent state.

JOSEF ŠPINKA.
JULIUS STAMPFER.

REFERENCES CITED

The following references are of record in the file of this patent:

UNITED STATES PATENTS

| Number | Name | Date |
|---|---|---|
| 2,384,532 | Bush et al. | Sept. 11, 1945 |

OTHER REFERENCES

The Chemical Senses by Moncrieff, 1944 ed., page 203.